(12) United States Patent
Ahn et al.

(10) Patent No.: US 8,978,412 B2
(45) Date of Patent: Mar. 17, 2015

(54) AIR CONDITIONER FOR VEHICLES

(75) Inventors: Yong Nam Ahn, Daejeon (KR); Tae Young Park, Daejeon (KR); Yong Jun Jee, Daejeon (KR); Jae Won Jeong, Daejeon (KR); Eun Gi Min, Daejeon (KR); Hae Jun Lee, Daejeon (KR)

(73) Assignee: Halla Visteon Climate Control Corporation, Daejeon (KR)

( * ) Notice: Subject to any disclaimer, the term of this patent is extended or adjusted under 35 U.S.C. 154(b) by 1057 days.

(21) Appl. No.: 12/955,970

(22) Filed: Nov. 30, 2010

(65) Prior Publication Data

US 2011/0132013 A1 Jun. 9, 2011

(30) Foreign Application Priority Data

Dec. 4, 2009 (KR) .......... 10-2009-0119651
Dec. 4, 2009 (KR) .......... 10-2009-0119663
Sep. 6, 2010 (KR) .......... 10-2010-0087092

(51) Int. Cl.
*F25B 39/02* (2006.01)
*F25B 5/02* (2006.01)
*B60H 1/32* (2006.01)
*F25B 41/06* (2006.01)

(52) U.S. Cl.
CPC *F25B 5/02* (2013.01); *B60H 1/323* (2013.01); *F25B 41/062* (2013.01); *F25B 2341/0683* (2013.01)
USPC .......... 62/525; 62/117; 62/199; 62/200

(58) Field of Classification Search
CPC ................. B60H 1/323; F25B 5/02
USPC .......... 62/117, 199, 200, 504, 524, 525
See application file for complete search history.

(56) References Cited

U.S. PATENT DOCUMENTS

| | | | |
|---|---|---|---|
| 5,385,035 A * | 1/1995 | Nishida et al. ............... | 62/525 |
| 2004/0093889 A1* | 5/2004 | Bureau et al. ............... | 62/434 |
| 2004/0123624 A1* | 7/2004 | Ohta et al. .................. | 62/498 |
| 2006/0137388 A1* | 6/2006 | Kakehashi et al. .......... | 62/513 |
| 2008/0098757 A1* | 5/2008 | Takeuchi et al. ............ | 62/217 |
| 2008/0289344 A1* | 11/2008 | Bonte et al. ................. | 62/114 |
| 2009/0090130 A1* | 4/2009 | Aung et al. .................. | 62/525 |
| 2009/0183520 A1 | 7/2009 | Yukimoto | |

FOREIGN PATENT DOCUMENTS

| | | |
|---|---|---|
| JP | S51-141947 | 11/1976 |
| JP | 1999-023104 A | 1/1999 |

(Continued)

OTHER PUBLICATIONS

Korean Office Action for corresponding Korean Application No. 10-2010-0087092, dated Oct. 16, 2014.

*Primary Examiner* — Johnathan Bradford
(74) *Attorney, Agent, or Firm* — Lowe Hauptman & Ham, LLP

(57) ABSTRACT

Provided is a refrigerant cycle of an air conditioner for vehicles, and more particularly, a refrigerant cycle of an air conditioner for vehicles having a first evaporating unit and a second evaporating unit disposed upstream and downstream in a direction in which air blown from a single blower flows to control an amount of the refrigerant supplied to each evaporating unit, thereby making it possible to obtain optimal radiating performance (cooling performance) and cooling efficiency (COP) through the design of the optimal refrigerant flow ratio depending on the cooling load.

3 Claims, 18 Drawing Sheets

(56) References Cited

FOREIGN PATENT DOCUMENTS

| JP | 2000-062452 | 2/2000 |
| JP | 2000-118231 | 4/2000 |
| JP | 2001-147050 | 5/2001 |
| JP | 2009-097779 | 5/2009 |
| KR | 10-2005-004870 A | 5/2005 |
| KR | 10-2007-0082274 A | 8/2007 |

* cited by examiner

PRIOR ART

AIR CONDITIONER FOR VEHICLES

TECHNICAL FIELD

This document relates to a refrigerant cycle of an air conditioner for vehicles, and more particularly, to a refrigerant cycle of an air conditioner for vehicles having a first evaporating unit and a second evaporating unit disposed upstream and downstream in a direction in which air blown from a single blower flows to control an amount of refrigerant supplied to each evaporating unit, thereby making it possible to obtain optimal radiating performance (cooling performance) and cooling efficiency (COP) through the design of the optimal refrigerant flow ratio depending on the cooling load.

BACKGROUND ART

An air conditioner for vehicles is an apparatus embedded in a car in order to cool or heat the inside of a car in summer or winter or secure a front and back view of a driver by defrosting a windshield, or the like, in rainy weather or in winter. Generally, the air conditioner has both a heating system and a cooling system to selectively intake outside air or inside air, heat or cool the air, and blow the heated or cooled air to the inside of a car, thereby cooling, heating, or ventilating the air.

As shown in FIG. 1, a general refrigerant cycle of the air conditioner is generally made by a refrigerant pipe 5, wherein the refrigerant pipe 5 connects a compressor 1 compressing and delivering a refrigerant, a condenser 2 condensing the high-pressure refrigerant delivered from the compressor 1, an expander 3 throttling the refrigerant condensed and liquefied in the condenser 2, an evaporator 4 evaporating the low-pressure liquid refrigerant throttled in the expander 3 by heat-exchanging it with air blown to the inside of a car to cool air discharged to the inside of a car by an endothermic action due to evaporation latent heat, or the like, thereby cooling the inside of a car through the following refrigerant circulation process.

The refrigerant cycle according to the prior art will be described in detail.

If a cooling switch (not shown) of an air conditioner for vehicles is turned-on, a compressor 1 is first driven by the power of an engine to intake air and compresses a low-temperature and a low-pressure gas refrigerant in order to convert it into a high-temperature and a high-pressure gas and delivers it to a condenser 2 and the condenser 2 condenses a gas refrigerant into a high-temperature and high-pressure liquid by heat-exchanging the gas refrigerant with outside air.

Next, the liquid refrigerant delivered in the high-temperature and high-pressure state from the condenser 2 is rapidly expanded by the throttling action of the expander 3 and is then delivered to the evaporator 4 in a low-temperature and low-pressure wet state and the evaporator 4 heat-exchanges the refrigerant while the air is blowing into the inside of a car by a blower (not shown).

In addition, the refrigerant introduced into the evaporator 4 is evaporated during the circulating process of the evaporator 4 and discharged in the low-temperature and low-pressure gas state and again sucked into the compressor 1, thereby recirculating the above-mentioned refrigerant cycle.

In the above-mentioned refrigerant circulating process, cooling the inside of a car is done by blowing cool air by the blower (not shown) with the evaporation latent heat of the liquid refrigerant circulating inside of the evaporator 4 while passing through the evaporator 4 and discharging the cooled air to the inside of a car.

In this case, a receiver driver (not shown) separating the liquid refrigerant is installed between the condenser 2 and an expansion valve 3, thereby making it possible to supply only the liquid refrigerant to the expansion value 3.

However, since the above-mentioned refrigerant cycle has a limitation in increasing cooling performance, improvement for increasing the cooling performance is urgently required. Further, there is a limitation in increasing the efficiency of the entire system due to the loads of the compressor 1.

In particular, in order to increase the cooling efficiency of the entire system, a need exists for a method for decreasing the pressure drop amount of the refrigerant and increasing the refrigerant flow to increase evaporation conditionality while shortening a passage length of the refrigerant by complexly considering the flow length and pressure drop amount of the refrigerant, the refrigerant flow, or the like, in particular, when the refrigerant flow velocity is the same.

An example of the expansion valve 3 is shown in FIG. 2.

FIG. 2 shows a thermal expansion valve (TXV), which reduces the high-temperature and high-pressure liquid refrigerant to the low-temperature and low-pressure liquid refrigerant, controls the refrigerant flow, and the entire pressure balance of the refrigerant cycle.

Referring to FIG. 2, the TXV is configured to include a main body 31 having an orifice 34 formed at the lower portion thereof between an inflow passage 32 and a discharge passage 33 in order to expand the refrigerant supplied from the condenser 2 and then supply it to the evaporator 4 and a connection passage 37 formed at the upper portion thereof in order to supply the refrigerant discharged from the evaporator 4 to the compressor 1, a valve 35 controlling the refrigerant flow passing through the orifice 34, and a shaft 38 moving the valve 35 while being elevated by a diaphragm 36 displaced according to the change in temperature of the refrigerant moving in the connection passage 37.

However, since the air conditioner to which the above-mentioned refrigerant cycle is applied uses the evaporator including the single evaporator unit, it has a limitation in improving the radiating performance and the cooling efficiency (COP).

DISCLOSURE

Technical Problem

An object of this document is to provide a refrigerant cycle of an air conditioner for vehicles having a first evaporating unit and a second evaporating unit disposed upstream and downstream in a direction in which air blown from a single blower flows to control an amount of refrigerant supplied to each evaporating unit, thereby making it possible to obtain optimal radiating performance (cooling performance) and cooling efficiency (COP) through the design of the optimal refrigerant flow ratio depending on the cooling load.

In addition, another object of this document is to provide a refrigerant cycle of an air conditioner for vehicles capable of shortening a channel length of the refrigerant and decreasing a pressure drop amount of the refrigerant by using an evaporator including a first evaporating unit and a second evaporating unit to increase a refrigerant flow and improve an evaporation condition, thereby making it possible to increase the efficiency of the entire system.

Further, another object of this document is to provide a refrigerant cycle of an air conditioner for vehicles capable of simultaneously supplying a refrigerant in two states to a first evaporating unit and a second evaporating unit of an evaporator, respectively, by using an expansion valve in which a first supply passage and a second supply passage are formed.

Technical Solution

In one general aspect, a refrigerant cycle 1000 of an air conditioner for vehicles includes: a compressor 100 sucking and compressing a refrigerant; a condenser 200 condensing the refrigerant compressed in the compressor 100; an expansion unit 300 expanding the refrigerant before or after branching the refrigerant discharged from the condenser 200; and an evaporator 400 including a first evaporating unit 410 and a second evaporating unit 420 each receiving and evaporating the expanded refrigerants branched from the expansion unit 300.

The first evaporating unit 410 may be disposed upstream and the second evaporating unit 420 is disposed downstream, in a direction in which air blown from a single blower 700 flows and the first evaporating unit 410 and the second evaporating unit 420 may be disposed in parallel to be closely contacted to each other.

The first evaporating unit 410 disposed upstream in the air flowing direction may be supplied with a relatively larger amount of refrigerant than the second evaporating unit 420 disposed downstream.

A refrigerant flow ratio distributed into the first evaporating unit 410 and the second evaporating unit 420, respectively, is in a range of 58%:42%~75%:25%.

The expansion unit 300 may include a first expansion valve 300a and a second expansion valve 300b each provided on a pair of branch passages 501 and 502 in which the refrigerant discharged from the condenser 200 is branched, and the expansion unit controls the refrigerant flow ratio distributed into the first evaporating unit 410 and the second evaporating unit 420 through the first expansion valve 300a and the second expansion valve 300b.

The expansion unit 300 may include a third expansion valve 300c mounted on a refrigerant passage 500 before the refrigerant discharged from the condenser 200 is branched and a decompressing unit 300d mounted on any one of the branch passages 501 and 502 after the refrigerant is branched, and the expansion unit controls the refrigerant flow ratio distributed into the first evaporating unit 410 and the second evaporating unit 420 through the decompressing unit 300d.

The expansion unit 300 may be a single expansion valve 300e provided at a starting point of where the refrigerant discharged from the condenser 200 is branched and flows from the pair of branch passages 501 and 502.

The expansion valve 300e may include: a main body 301 including an inlet 310, a first supply passage 320 throttling and supplying some refrigerant introduced from the inlet 310, a second supply passage 330 throttling and supplying the remaining refrigerant, and a discharge passage 340 introduced with the refrigerant discharged from the evaporator 400 and discharging the refrigerant; a power element adjacently provided to the discharge passage 340 and compressing or expanding according to the refrigerant temperature; and control units 360 extending from the power element 350 and opening and closing one or both of the first supply passage 320 and the second supply passage 330.

The first supply passage 320 may communicate with the first evaporating unit 410 disposed upstream in the air flow direction and the second supply passage 330 may communicate with the second evaporating unit 420 disposed downstream in the air flow direction.

The main body 301 of the expansion valve 300e may include: a first space part 321 and a second space part 331 each communicating with the inlet 310 and branching the refrigerant; and a first outlet 324 and a second outlet 334 each communicating with the first space part 321 and the second space part 331 by the first communicating hole 323 and the second communicating hole 333, wherein the first supply passage 320 may be formed by the first space part 321, the first communicating hole 323, and the first outlet 324 and the second supply passage 330 may be formed by the second space part 331, the second communicating hole 333, and the second outlet 324.

In the main body 301 of the expansion valve 300e, the inlet 310 may be formed between the first space part 321 and the second space part 331.

The control units 360 may include rods 361 extending to one region of the first space part 321 and the second space part 331 from the power element 350 and moving in a height direction according to a refrigerant temperature and balls 362 formed at the ends of the rod 361 to control an degree of opening of one of the first communicating hole 323 and the second communicating hole 333 corresponding to the first space part 321 and the second space part 331.

The control units 360 may control the moving distances of the pair of rods 361 by the power element 350 to be the same and control the refrigerant flow ratio distributed into the first space part 321 and the second space part 331 by making the size of the first communicating hole 323 and the second communicating hole 333 different from each other, or the size of the balls 362 different from each other.

The first space part 321 and the second space part 331 may be provided with a first guide part 322 and a second guide part 332 inclined to the first communicating hole 323 and the second communicating hole 333 corresponding to each other to guide the positions of the balls 362 formed in each control unit 360.

The control unit 360 may include elastic units 370 provided in one region of the first space part 321 and the second space part 331 to apply an elastic force to a side supporting the balls 362 of the rods 361.

The main body 301 of the expansion valve 300e may include: a third space part 325 communicating with the inlet 310; a third outlet 328 communicating with the third space part 325 by the third communicating hole 327 to form the first supply passage 320; and a fourth outlet 336 communicating with the third space part 325 by an orifice 335 to form the second supply passage 330.

The orifice 335 may be formed in a shape where the internal diameter of the orifice 335 is gradually narrow in a length direction and then becomes wide.

The control unit 360 may include the rod 361 extending to the third space part 325 from the power element 350 and moving in a height direction according to the refrigerant temperature and the ball 362 formed at the end of the rod 361 to control the degree of opening of the third communicating hole 327 corresponding to the third space part 325.

The refrigerant cycle 1000 of an air conditioner for vehicles may further include an ejector 600 provided between the evaporator 400 and the compressor 100 to suck and boost the refrigerant discharged from one of the first evaporating unit 410 and the second evaporating unit 420 by using the flow velocity of the refrigerant discharged from the other one of the first evaporating unit 410 and the second evaporating unit 420 and supply it to the compressor 100.

The first evaporating unit 410 and the second evaporating unit 420 may be formed so that the single evaporator 400 is separated into two evaporation regions.

Advantageous Effects

According to this document, the refrigerant cycle of an air conditioner for vehicles has the first evaporating unit and the second evaporating unit disposed upstream and downstream in a direction in which the air blown from the single blower flows to control the amount of refrigerant supplied to each evaporating unit, thereby making it possible to obtain the optimal radiating performance (cooling performance) and cooling efficiency (COP) through the design of the optimal refrigerant flow ratio depending on the cooling load.

Further, according to this document, the refrigerant cycle of an air conditioner for vehicles shortens the channel length of the refrigerant and decreases the pressure drop amount of the refrigerant by using the evaporator including the first evaporating unit and the second evaporating unit to increase the refrigerant flow and improve the evaporation conditions, thereby making it possible to increase the efficiency of the entire system.

In addition, according to this document, the refrigerant cycle of an air conditioner for vehicles can simultaneously supply the refrigerant in two states to the first evaporation unit and the second evaporation unit of the evaporator, respectively, by using the expansion valve in which the first supply passage and the second supply passage are formed.

DESCRIPTION OF DRAWINGS

The above and other objects, features and advantages of this document will become apparent from the following description of preferred embodiments given in conjunction with the accompanying drawings, in which.

DETAILED DESCRIPTION OF MAIN ELEMENTS

Figure 1:
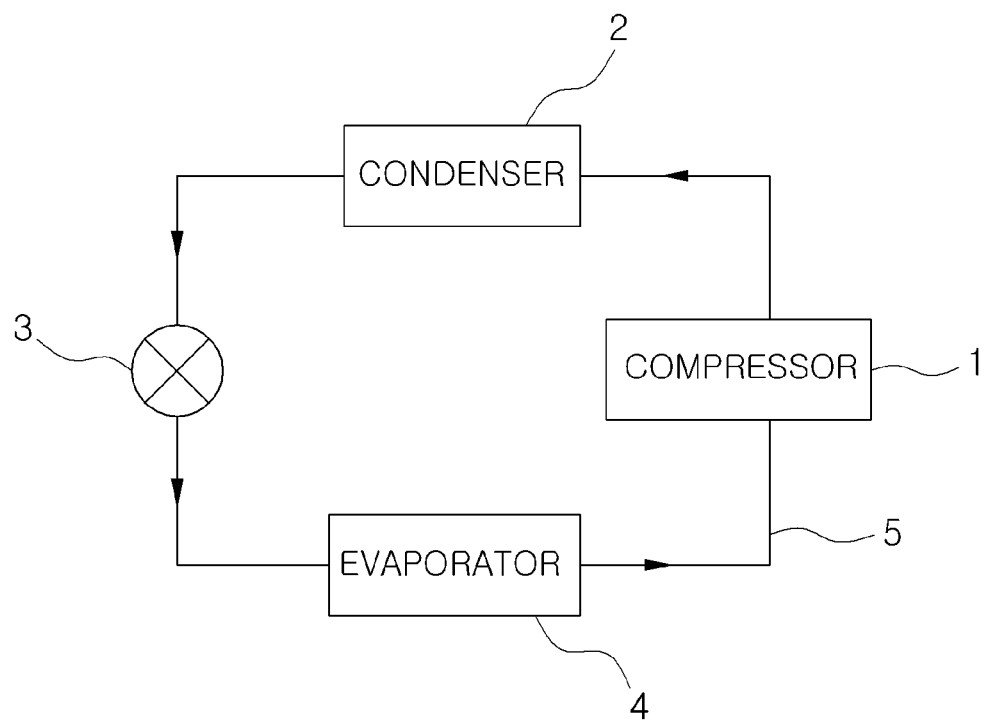
FIG. 1 is a configuration diagram showing a refrigerant cycle of an air conditioner for vehicles.

1000: REFRIGERANT CYCLE OF AIR CONDITIONER FOR VEHICLES
  100: COMPRESSOR
  200: CONDENSER
  300: EXPANSION UNIT (300A: FIRST EXPANSION VALVE, 300B: SECOND EXPANSION VALVE, 300C: THIRD EXPANSION VALVE, 300D: DECOMPRESSING UNIT, 300E: SINGLE EXPANSION VALVE)
  301: MAIN BODY
  310: INLET
  320: FIRST SUPPLY PASSAGE
  321: FIRST SPACE PART
  322: FIRST GUIDE PART
  323: FIRST COMMUNICATING HOLE
  324: FIRST INLET
  325: THIRD SPACE PART
  326: THIRD GUIDE PART
  327: THIRD COMMUNICATING HOLE
  328: THIRD OUTLET
  330: SECOND SUPPLY PASSAGE
  331: SECOND SPACE PART
  332: SECOND GUIDE PART
  333: SECOND COMMUNICATING HOLE
  334: SECOND OUTLET
  335: ORIFICE
  336: FOURTH OUTLET
  340: DISCHARGE PASSAGE
  350: POWER ELEMENT
  351: WORKING UNIT
  352: DIAPHRAGM
  360: CONTROL UNIT
  361: ROD
  362: BALL
  370: ELASTIC UNIT
  400: EVAPORATOR
  410: FIRST EVAPORATING UNIT
  420: SECOND EVAPORATING UNIT
  500: REFRIGERANT PASSAGE
  501, 502: BRANCH PASSAGE
  600: EJECTOR
  700: BLOWER
  800: AIR CONDITIONING CASE

[Best Mode]

Hereinafter, a refrigerant cycle 1000 for an air conditioner for vehicles having the foregoing features will be described in detail with reference to the accompanying drawings.

A refrigerant cycle 1000 of an air conditioner for vehicles is configured to include a compressor 100, a condenser 200, an expansion unit 300, and an evaporator 400.

In this configuration, a refrigerant circulating in the compressor 100, the condenser 200, the expansion unit 300, and the evaporator 400 is circulated through a refrigerant pipe connecting all of them.

First, the compressor 100 is driven by being supplied with power from a power supply source (an engine or a motor, or the like) to suck and compress a gas refrigerant discharged from the evaporator 400, thereby producing it into a high-temperature and high-pressure gas state.

The condenser 200 heat-exchanges the high-temperature and high-pressure gas refrigerant discharged from the compressor 100 with outside air to condense it into a high-temperature and high-pressure liquid state.

The expansion unit 300 expands the high-temperature and high-pressure liquid refrigerant discharged from the condenser 200 to throttle it into a low-temperature and low-pressure wet state.

In this configuration, the expansion unit 300 supplies an expanded refrigerant to a first evaporating unit 410 and a second evaporating unit 420 in the evaporator 400, respectively, and is provided before or after being branched, based on a pair of branch passages 501 and 502 branched from a single refrigerant passage 500.

The expansion unit 300 may be variously formed, including a configuration having a pair of expansion valves 300e, a configuration using the expansion valve 300e and a decompressing unit 300d, and a configuration using the single expansion valve 300e. A detailed example will be described below.

A receiver driver (not shown) separating a gas refrigerant and a liquid refrigerant is mounted between the condenser 200 and the expansion unit 300.

The expansion unit 300 includes the receiver driver, thereby supplying only the liquid refrigerant.

The evaporator 400 heat-exchanges the low-pressure liquid refrigerant throttled by the expansion unit 300 with air blowing to the inside of a car to be evaporated, thereby cooling air discharged to the inside of a car.

In this case, the evaporator 400 is configured to include the first evaporating unit 410 and the second evaporating unit 420.

In other words, one 501 of the pair of branch passages 501 and 502 branched from the refrigerant passage 500 is connected to an inlet of the first evaporating unit 410 and the other one 502 of the pair of branch passages 501 and 502 is connected to an inlet of the second evaporating unit 420.

In addition, a refrigerant flowing in the first evaporating unit 410 and the second evaporating unit 420, respectively, and discharged therefrom is merged and is then introduced into the compressor 100.

In this case, the first evaporating unit 410 and the second evaporating unit 420 are disposed in parallel while being closely contacted to each other in order to sequentially pass in a direction in which air blown from a single blower 700 flows.

The first evaporating unit 410 and the second evaporating unit 420 are provided in an air conditioning case 800 and are vertically disposed in a flow direction of the air.

The evaporator 400 is two independent evaporators 400, which may configured to include the first evaporating unit 401 and the second evaporating unit 420, respectively.

Further, the evaporator 400 is a single evaporator 400, which may be configured to include two evaporating regions (a first evaporating unit 410 and a second evaporating unit 420).

Figure 3:
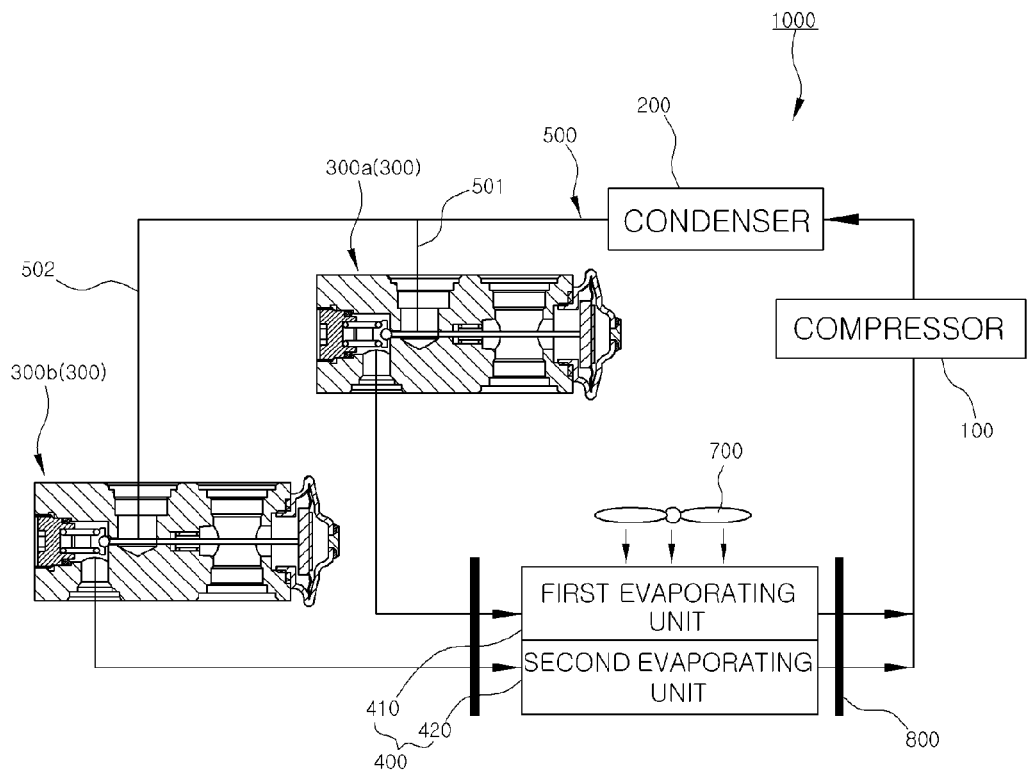
FIG. 3 is a configuration diagram showing a refrigerant cycle of an air conditioner for vehicles (a structure where an expansion unit includes a pair of expansion valves)

As shown in FIG. 3, the first evaporating unit 410 is defined as being disposed upstream in an air flow direction and the second evaporating unit 420 is defined as being disposed downstream in an air flow direction.

The first evaporating unit 410 heat-exchanges an internal refrigerant with relatively hotter air than that of the second evaporating unit 420, such that a refrigerant load becomes large.

On the other hand, the second evaporating unit 420 heat-exchanges the internal refrigerant with primarily cooled air while passing through the first evaporating unit 410, such that a cooling load becomes relatively small.

Figure 4:
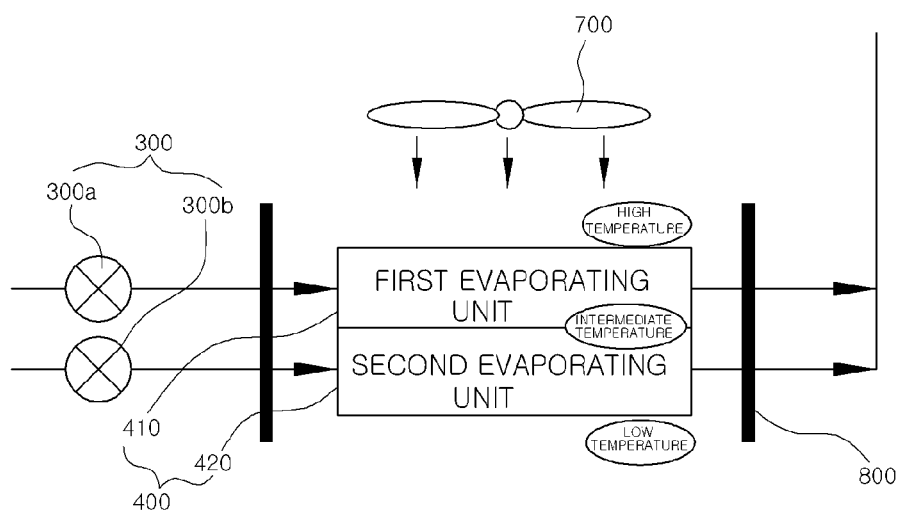
FIG. 4 is a diagram showing the change in temperature while air blown from a single blower in an air conditioner for vehicles sequentially passes through first and second evaporating units.

In other words, as briefly shown in FIG. 4, as the air blown from the blower 700 sequentially passes through the first evaporating unit 410 and the second evaporating unit 420, the heat-exchange is made in the state where air before passing through the first evaporating unit 410 is at the highest temperature, air cooled while passing through the first evaporating unit 410 is at an intermediate temperature, and air cooled again while consecutively passing through the second evaporating unit 420 is at a low temperature.

Therefore, it is preferable that the refrigerant cycle 1000 of an air conditioner for vehicles of this document supplies a relatively larger amount of refrigerant to the first evaporating unit 410 disposed upstream than the second evaporating unit 420 disposed downstream in a sequence of passing air blown from the single blower 700.

In other words, this document supplies a larger amount of refrigerant to the first evaporating unit 410 region having a larger cooling load than the second evaporating unit 420, thereby making it possible to more effectively cool external air.

In this case, it is preferable that the flow ratio (the first evaporating unit 410: a second evaporating unit 420) of refrigerant distributed into the first evaporating unit 410 and the second evaporating unit 420, respectively, is in a range of 58%:42%~75%:25%.

Figure 5:
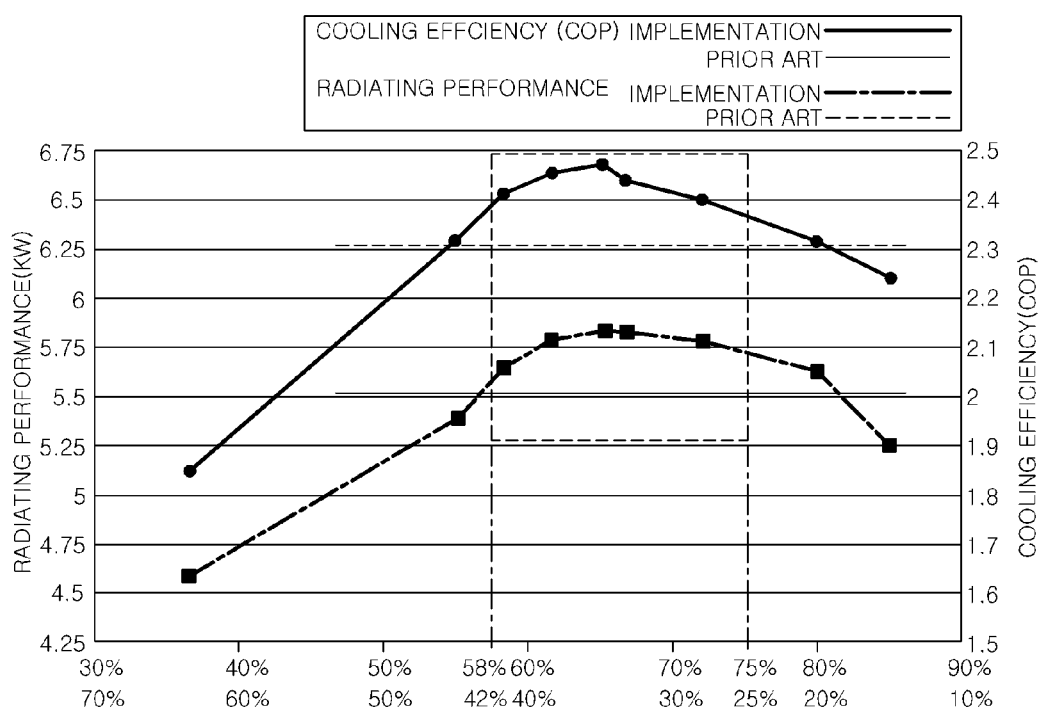
FIG. 5 is a graph showing radiating performance (cooling performance) and cooling performance (COP) according to a refrigerant flow ratio of a first evaporating unit and a second evaporating unit.

FIG. 5 is a graph showing the radiating performance (cooling performance) and the cooling efficiency (COP) according to the prior art to the radiating performance (cooling performance) and the cooling efficiency (COP) according to the refrigerant flow ratio of the first evaporating unit 410 and the second evaporating unit 420.

The prior art shown in FIG. 5 shows the radiating performance and the cooling efficiency (COP) of the configuration having the single evaporating unit corresponding to FIG. 1.

As shown in FIG. 5, it can be appreciated that the refrigerant cycle 1000 of an air conditioner for vehicles of this document further improves the radiating performance (cooling performance) and the cooling efficiency (COP) having the single evaporating unit, in a period where the refrigerant flow ratio is set in the range of 58%:42%~75%:25% (a box portion of a dotted line).

Meanwhile, if the refrigerant flow ratio is out of the above-mentioned range, the performance is degraded than the prior art, which is not preferable.

As described above, the refrigerant cycle 1000 of an air conditioner for vehicles of this document optimally designs the refrigerant flow ratio distributed into the first evaporating unit 410 disposed upstream and the second evaporating unit 420 disposed downstream (the flow supplied to the first evaporating unit 410: the flow supplied to the second evaporating unit 420=58%:42%~75%:25%), to obtain the optimal radiating performance (cooling performance) and the cooling efficiency (COP), thereby making it possible to maximize the cooling performance and the efficiency.

The refrigerant flow ratio of refrigerant supplied to the first evaporating unit 410 and the second evaporating unit 420 is controlled by the expansion unit 300.

First, FIG. 3 shows an example where the refrigerant discharged from the condenser 200 is branched and a first expansion valve 300a and a second expansion valve 300b are each provided on the pair of branch passages 501 and 502.

As a structure where the expansion unit 300 includes the first expansion valve 300a and the second expansion valve 300b, a structure shown in FIG. 3 controls the refrigerant flow passing through each of the first expansion valve 300a and the second expansion valve 300b to control the refrigerant flow ratio distributed into the first evaporating unit 410 and the second evaporating unit 420.

Figure 2:
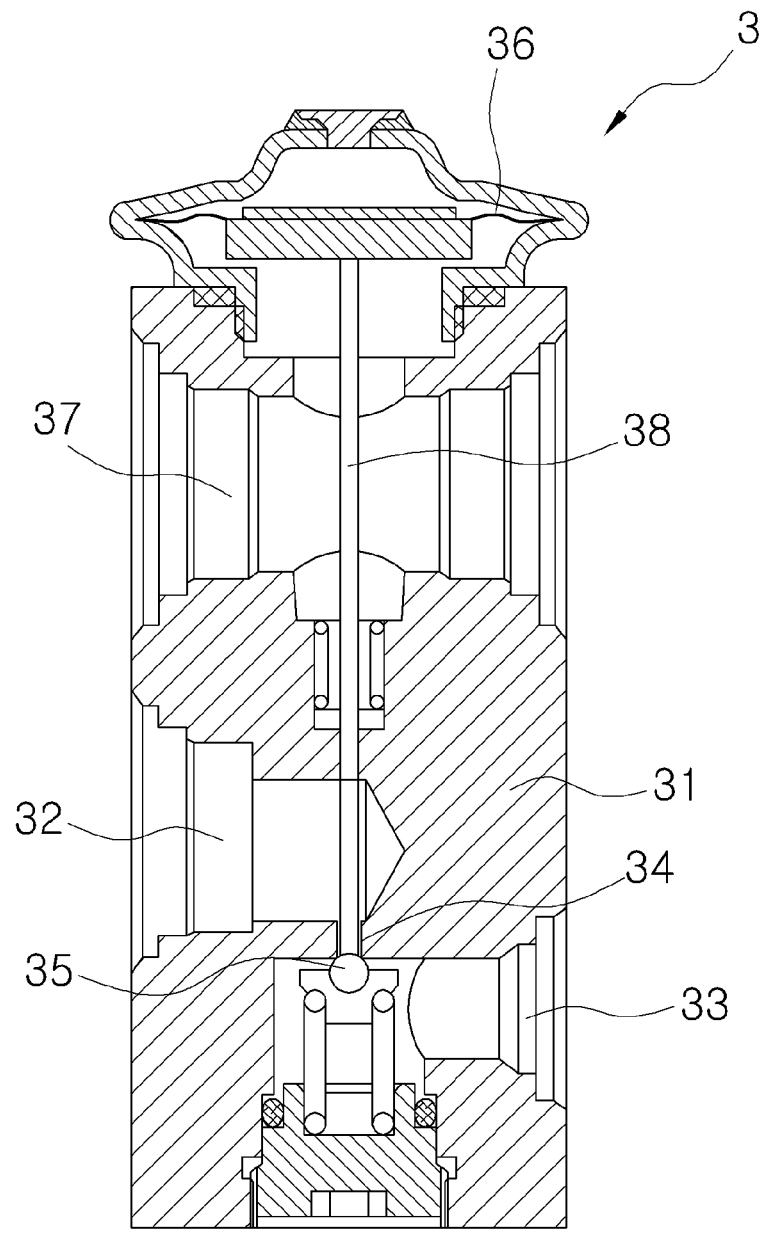
FIG. 2 is a cross-sectional view showing a general expansion valve.

The expansion valve 300e may use the structure shown in FIG. 2. The structure of the expansion valve 300e is described in the prior art and therefore, the detailed description thereof will be omitted.

Figure 6:
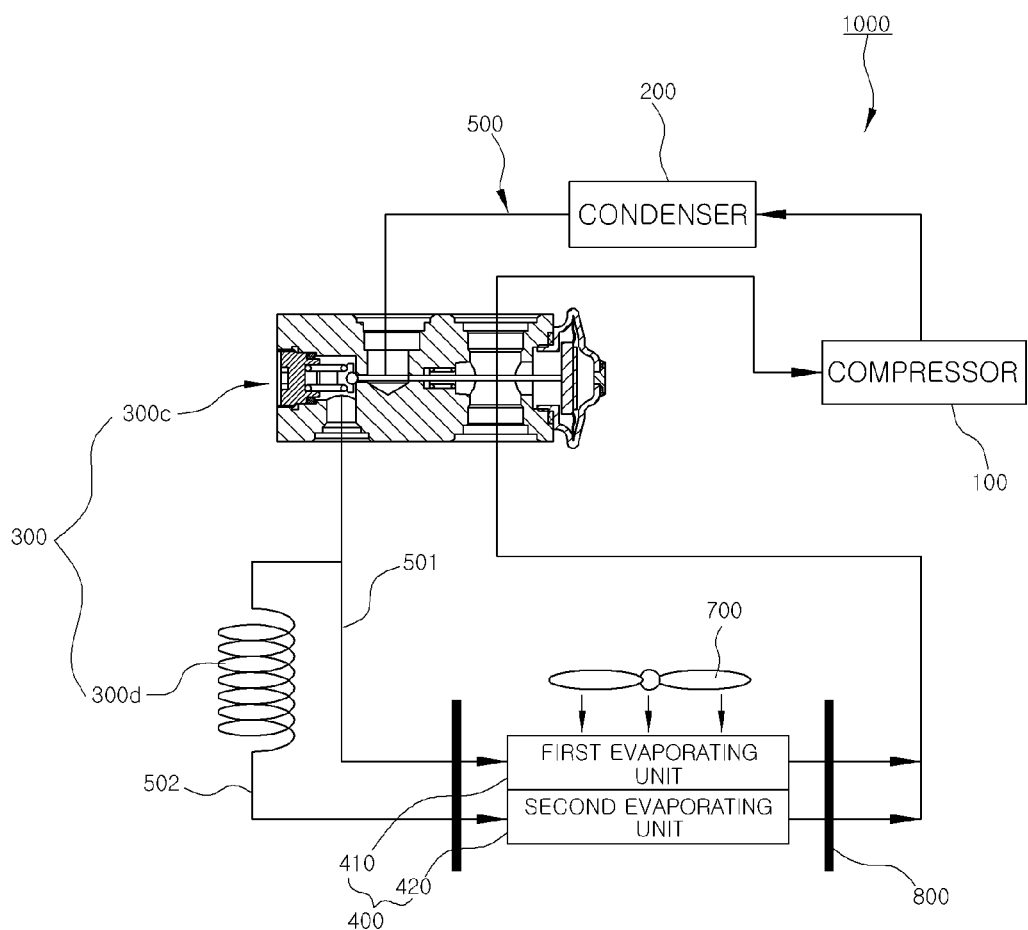
FIG. 6 is another configuration diagram of a refrigerant cycle of an air conditioner for vehicles (a structure where an expansion unit includes an expansion valve and a decompressing unit)
Figure 7:
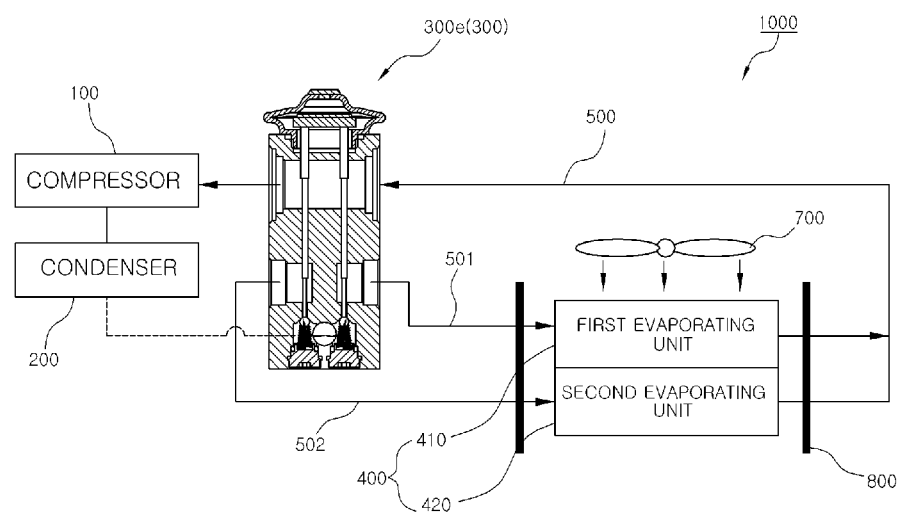
FIG. 7 is another configuration diagram of a refrigerant cycle of an air conditioner for vehicles (an expansion unit is configured to have a single expansion valve)
Figure 8:
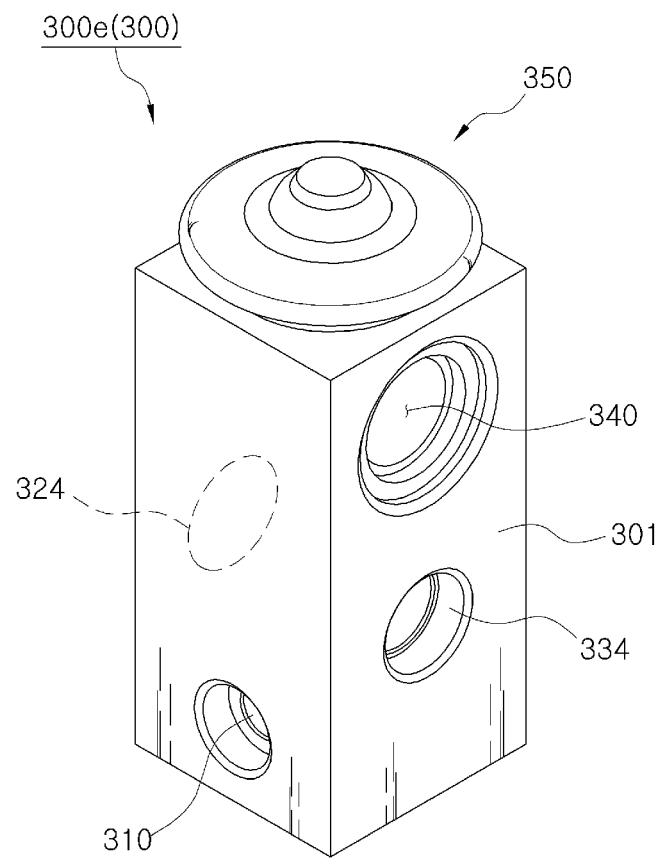
FIGS. 8 to 12 are a perspective view, an exploded perspective view, a cross-sectional perspective view, a partial cross-sectional perspective view, and a body cross-sectional view showing an expansion valve of the refrigerant cycle of an air conditioner for vehicles shown in FIG. 7.
Figure 9:
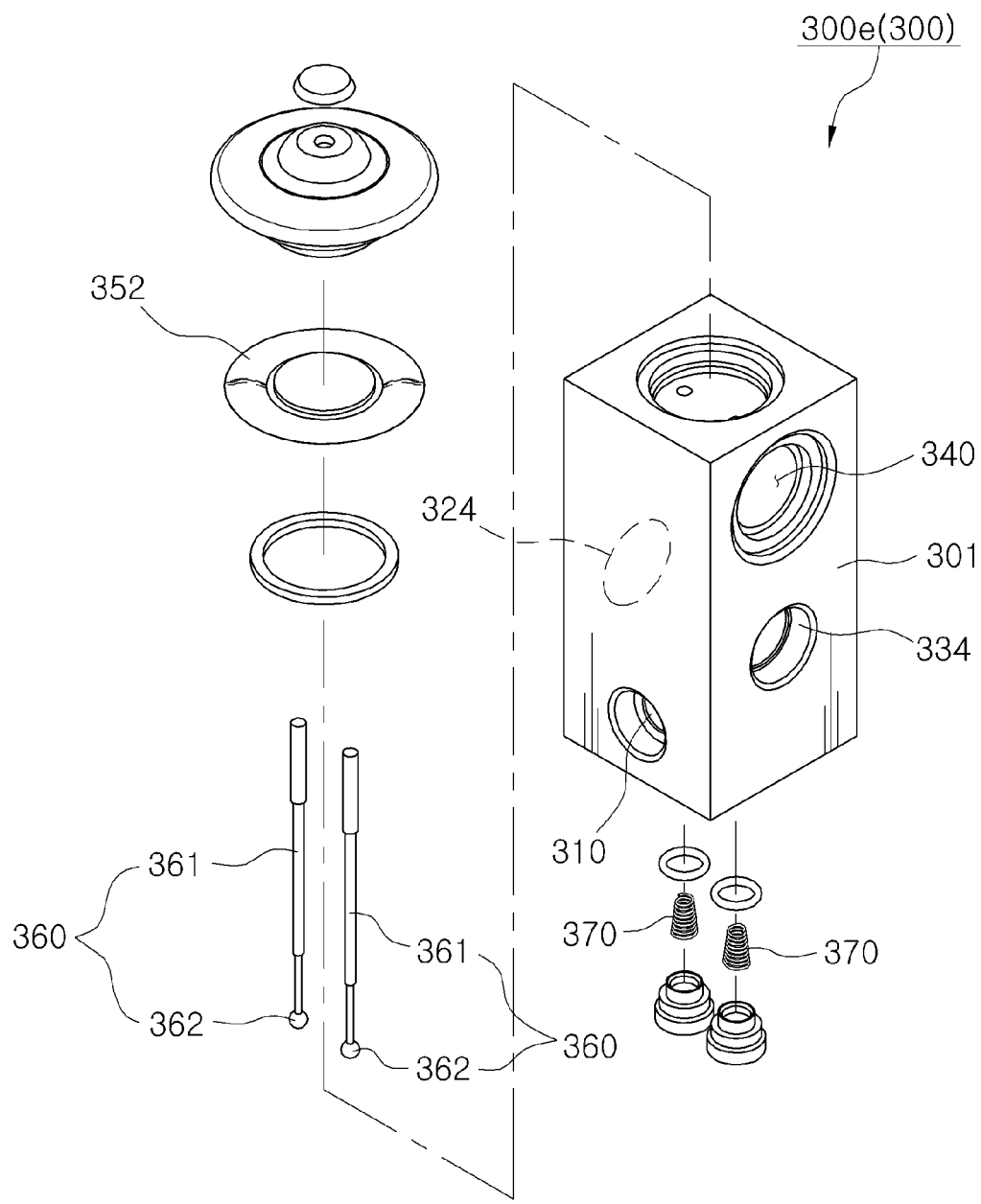
Figure 10:
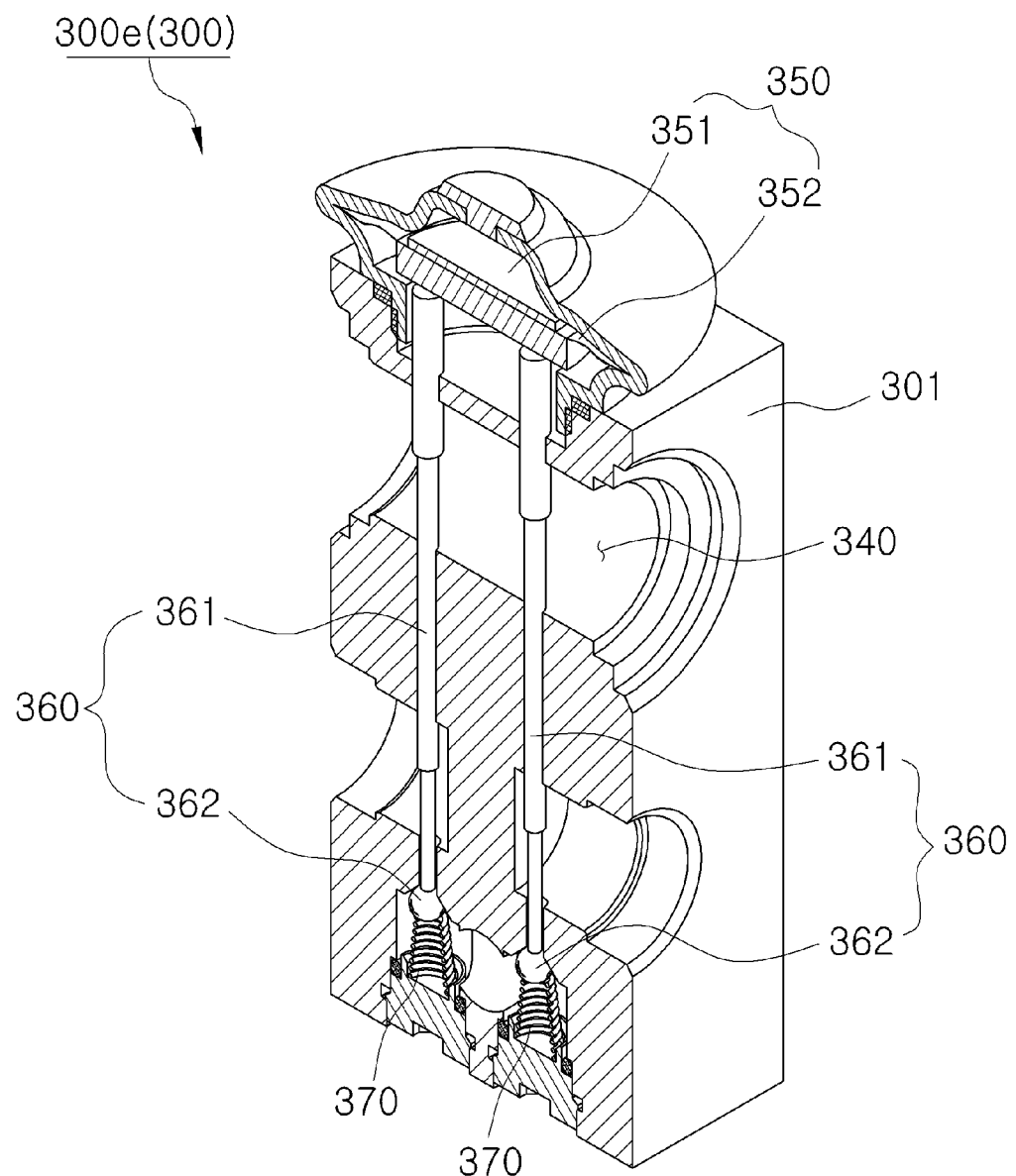
Figure 11:
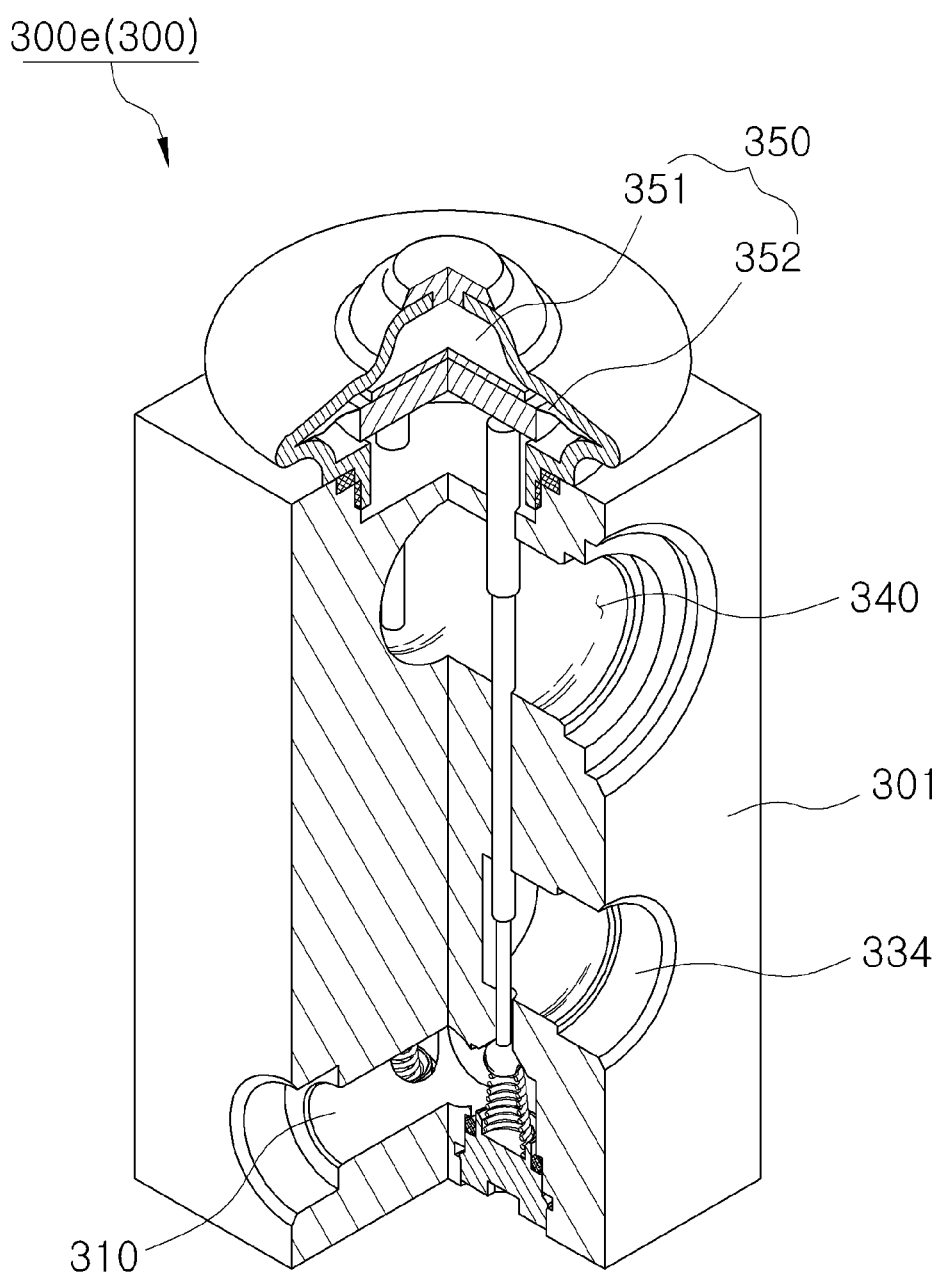
Figure 12:
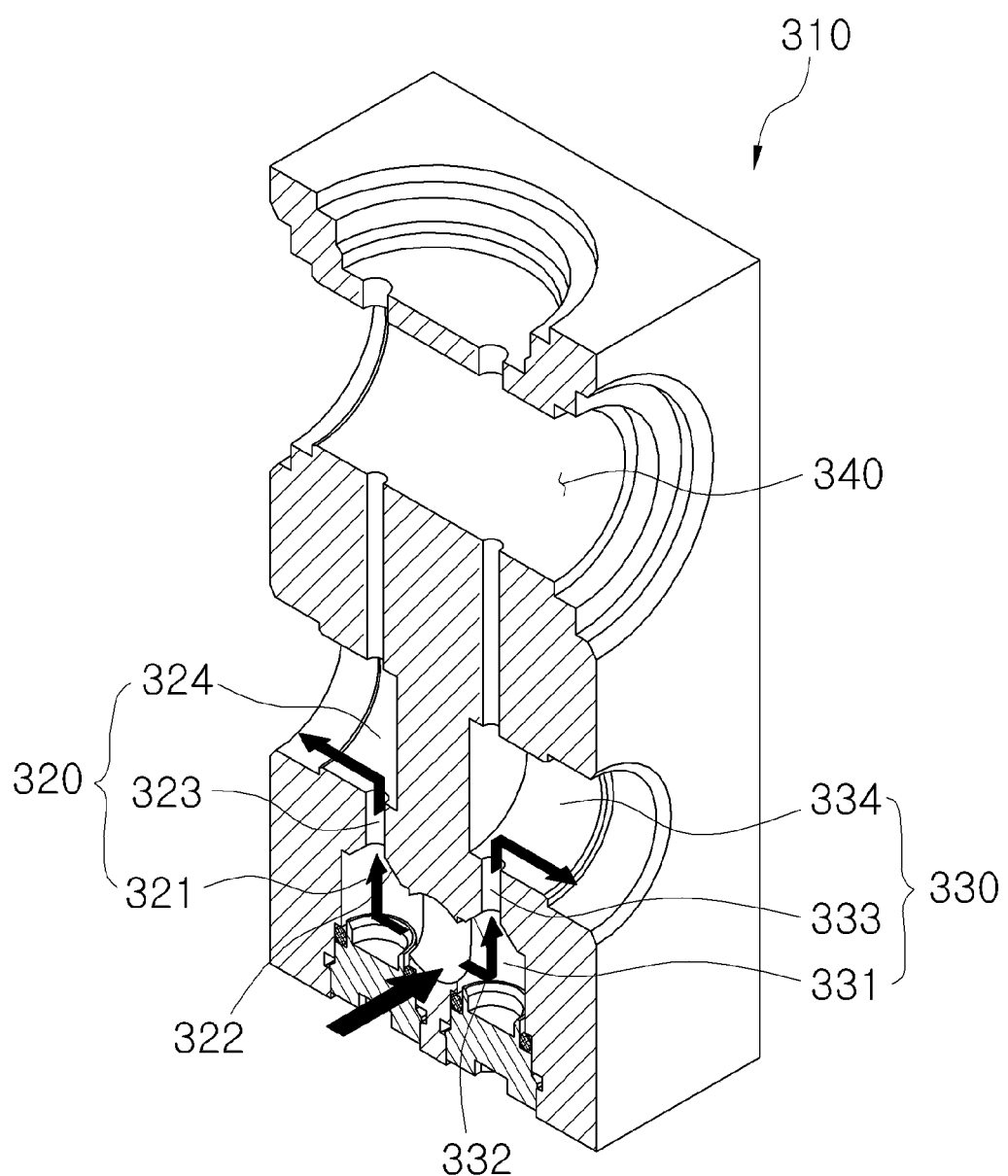

In the structure shown in FIG. 6, the expansion unit 300 includes a third expansion valve 300c and a decompressing unit 300d.

The third expansion valve 300c has the same structure as the first expansion valve 300a and the second expansion valve 300d as shown in FIG. 3, but is marked as "third" in order to be discriminated from the first expansion valve 300a and the second expansion valve 300b.

In more detail, the expansion unit 300 is configured to include the third expansion valve 300c mounted on the refrigerant passage 500 before the refrigerant discharged from the condenser 200 is branched and the decompressing unit 300d mounted on any one of the branch passages 501 and 502 of the refrigerant passing through the third expansion valve 300c.

In the structure shown in FIG. 6, the entire amount of the refrigerant is expanded while passing through the third expansion valve 300c and the expanded refrigerant is branched through the pair of branch passages 501 and 502, respectively, and is supplied to the first evaporating unit 410 and the second evaporating unit 420, respectively.

In this case, the decompressing unit 300d is provided at one of the pair of branch passages 501 and 502 to control the refrigerant flow ratio distributed into the first evaporating unit 410 and the second evaporating unit 420 through the decompressing unit 300d.

The decompressing unit 300d may use a pipe or a capillary tube that again decompresses and expands the refrigerant expanded through the third expansion valve 300c, wherein the pipe or the capillary tube has a structure having a reduced aperture toward the refrigerant flowing direction.

In addition, in the refrigerant cycle 1000 of an air conditioner for vehicles of this document, the expansion unit 300 may use the single expansion valve 300e provided at a starting point of the pair of branch passages 501 and 502 in which the refrigerant discharged from the condenser 200 is branched and flows.

The single expansion valve 300e is formed to include a main body 301, a power element 350, and control units 360.

The main body 301 is a basic body forming the expansion valve 300e and is configured to include an inlet 310, a first supply passage 320, a second supply passage 330, and a discharge passage 340.

The inlet 310 is connected to the refrigerant passage 500 and introduces a refrigerant into the main body 301.

The first supply passage 320 and the second supply passage 330 communicate with the inlet 310 and throttle a refrigerant and supply it to the first evaporating unit 410 and the second evaporating unit 420, respectively. The first supply passage 320 throttles some refrigerant from the inlet 310 and supplies it to the first evaporating unit 410 and the second supply passage 330 throttles the remaining refrigerant and supplies it to the second evaporating unit 420.

The discharge pas sage 340 is passed the refrigerant passing through the evaporator 400 and controls the throttling degree according to the temperature of the evaporator 400.

The power element 350 is provided to be adjacent to the discharge passage 340 to compress or expand a refrigerant according to the temperature.

In detail, the power element 350 is configured to include a working unit 351 filled with a working fluid expanded or contracted in response to the refrigerant temperature in the discharge passage 340 and a diaphragm 352 closely contacted to the working unit 351.

In this configuration, the control units 360 extend from the power element 350 to open and close one or both of the first supply passage 320 and the second supply passage 330 by operating the power element 350.

The control units 360 extend from the power element 350 and are configured to include rods 361 moving in a height direction according to the refrigerant temperature and balls 362 formed at the ends of the rods 361.

In this configuration, the control units 360 further include elastic units 370 provided to apply an elastic force to a side supporting the balls 362.

In the drawings, the expansion unit 300 using the single expansion valve 300e may be largely classified into a structure shown in FIGS. 7 to 13 and a structure shown in FIGS. 14 to 19 according to the internal shape of the main body 301, the difference in the number of control units 360, etc. First, the structure shown in FIGS. 7 to 13 will be described.

In the structure shown in FIGS. 7 to 13, the refrigerant is introduced into the main body 301 through the inlet 310 from the single refrigerant passage 500 and is branched and throttled, and then supplied to the region of the first evaporating unit 410 and the second evaporating unit 420 of the evaporator 400.

In detail, the main body 301 of the expansion valve 300e is provided with a first space part 321 and a second space part 331 each communicating with the inlet 310 to branch a refrigerant and is provided with a first outlet 324 and a second outlet 334 each communicating with the first space part 321 and the second space part 331 by a first communicating hole 323 and a second communicating hole 333.

In this configuration, the first supply passage 320 is configured to include the first space part 321, the first communicating hole 323, and the first outlet 324. The length of the rod 361 is controlled to dispose the ball 362 of the control unit 360 in the first space part 321 and the throttling degree and supply amount of refrigerant are determined by the degree of opening of the first communicating hole 333.

Further, the second supply passage 330 is configured to include the second space part 331, the second communicating hole 333, and the second outlet 334. The length of the rod 361 is controlled to dispose the ball 362 of the control unit 360 in the second space part 331 and the throttling degree and supply amount of the refrigerant are determined by the degree of opening of the second communicating hole 323.

In other words, FIGS. 7 to 13 show an example where the first supply passage 320 and the second supply passage 330 having the same shape are formed in the main body 301 and a pair of the control units 360.

Therefore, the refrigerant introduced through the inlet 310 is branched between the first supply passage 320 and the second supply passage 330, and is throttled by a fluid flow and supplied to the region of the first evaporating unit 410 and the second evaporating unit 420.

In the main body 301, it is preferable to easily control the branch degree of refrigerant by forming the inlet 310 between the first space part 321 and the second space part 331.

Figure 13:
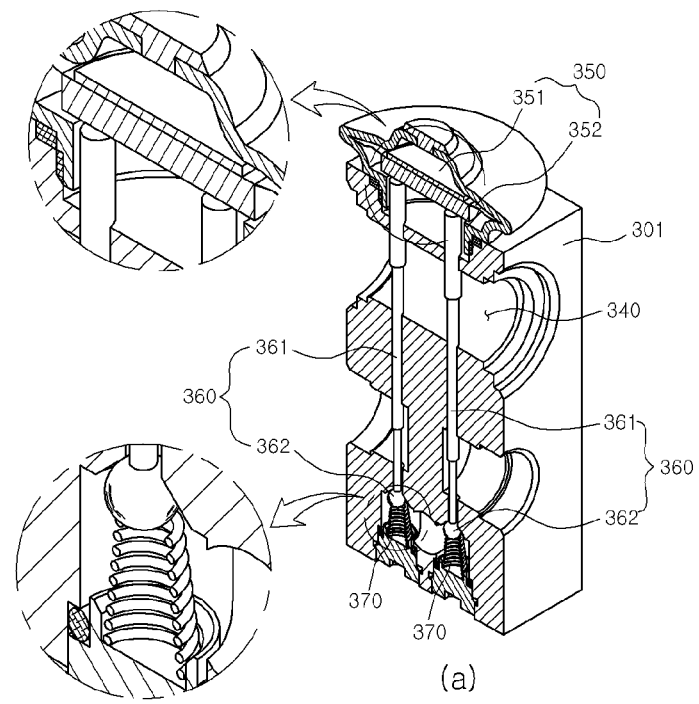
FIG. 13 is a diagram for explaining an internal operation of the expansion valve of the refrigerant cycle of an air conditioner for vehicles shown in FIG. 7.
Figure 13:
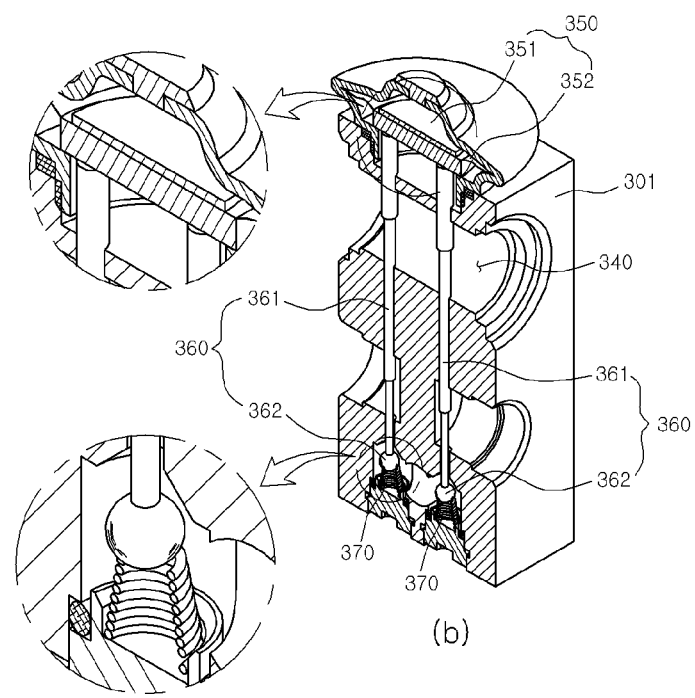
Figure 14:
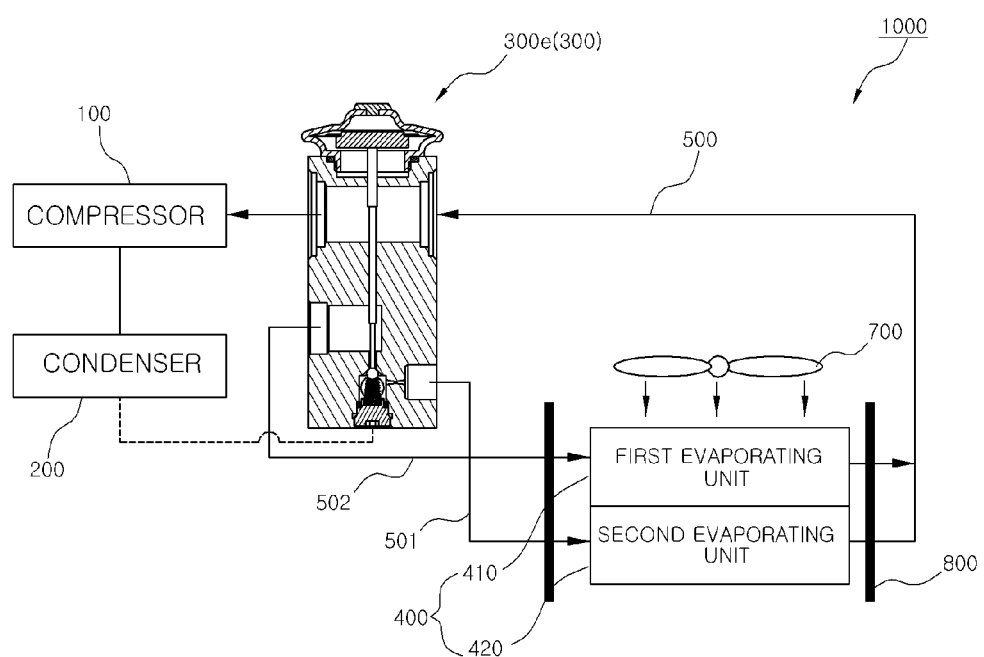
FIG. 14 is another configuration diagram of a refrigerant cycle of an air conditioner for vehicles (an expansion unit is configured to have a single expansion valve)
Figure 15:
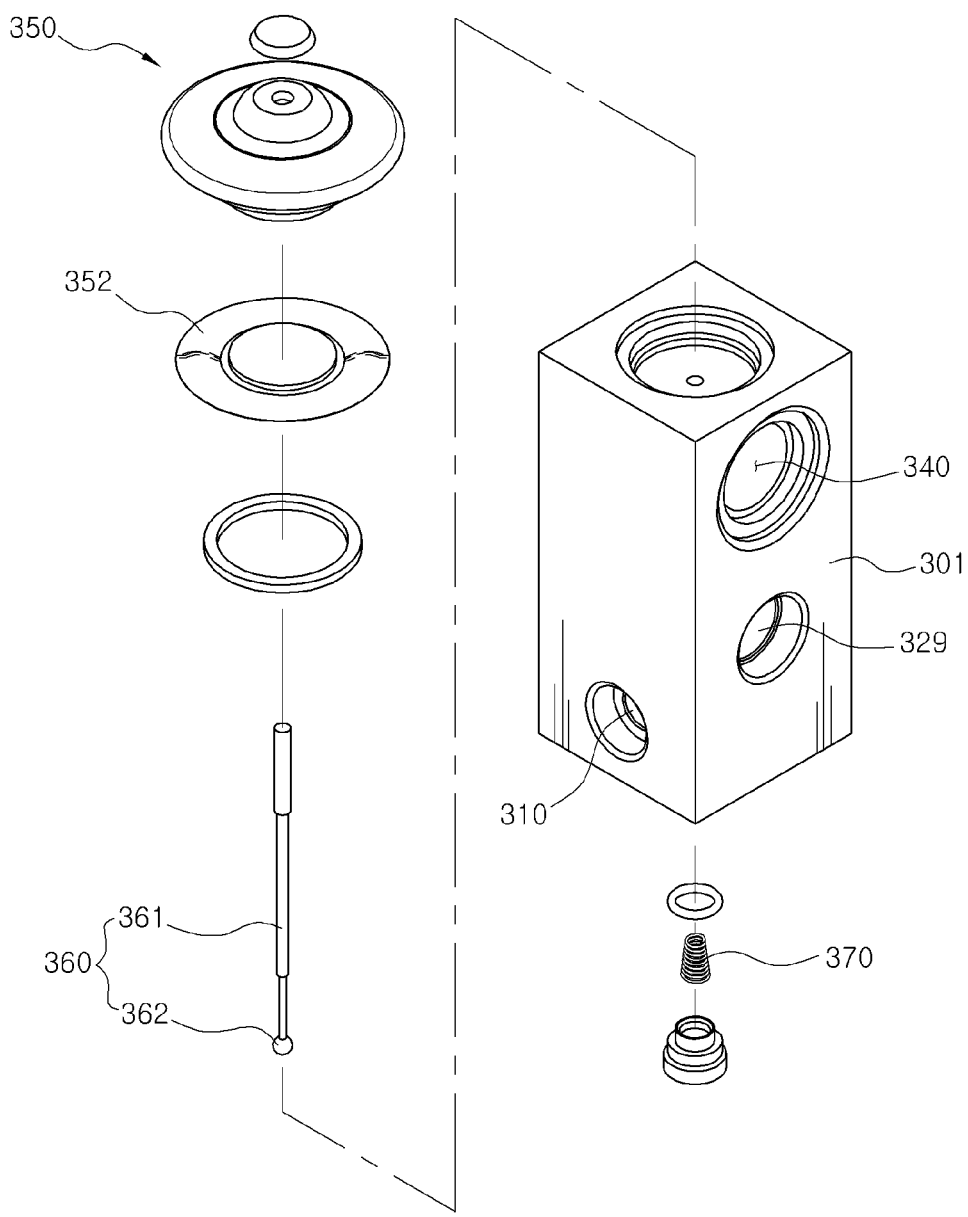
FIGS. 15 to 18 are an exploded perspective view, a cross-sectional perspective view, a partial cross-sectional perspective view, and a body cross-sectional view showing an expansion unit of the refrigerant cycle of an air conditioner for vehicles shown.
Figure 16:
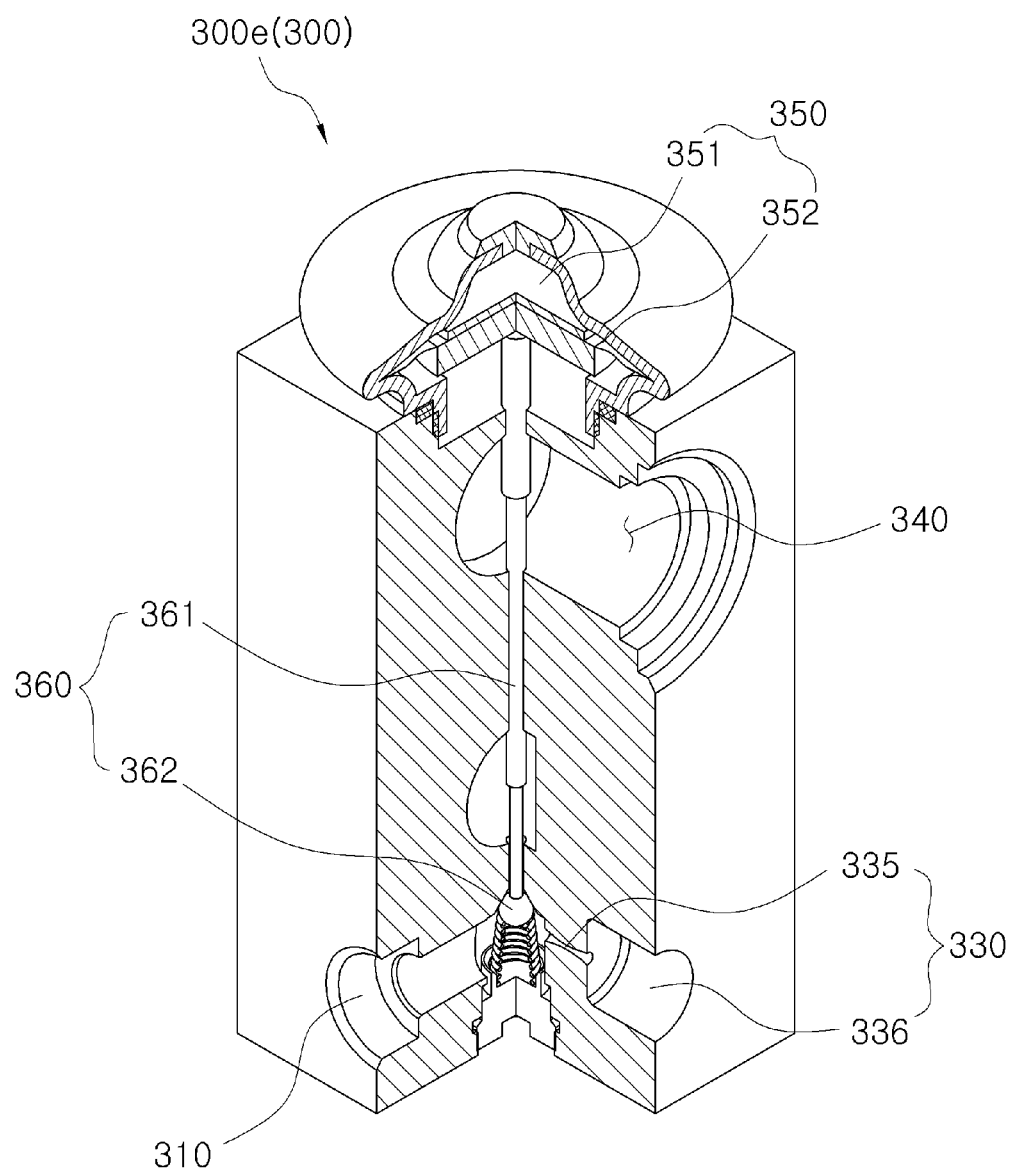
Figure 17:
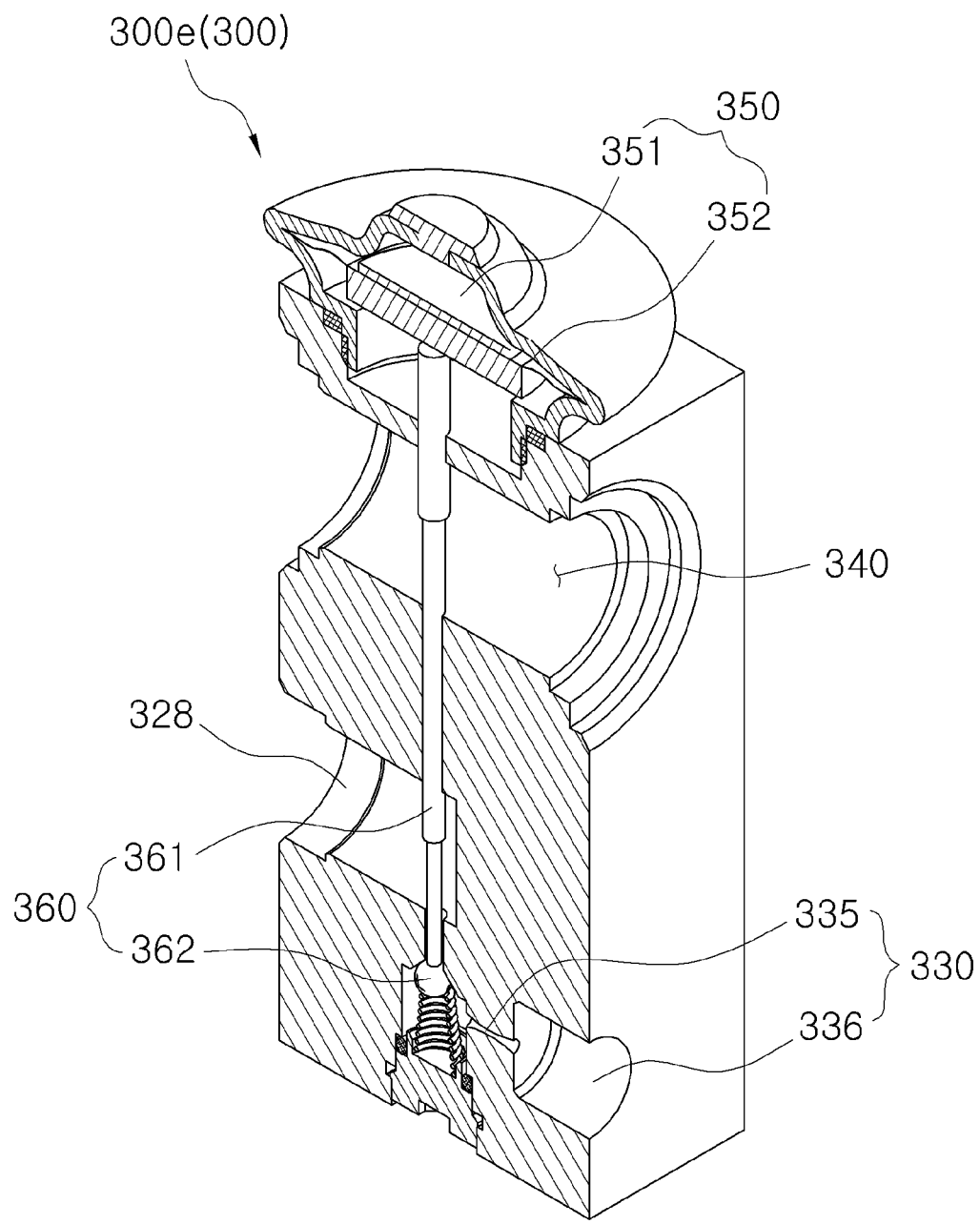
Figure 18:
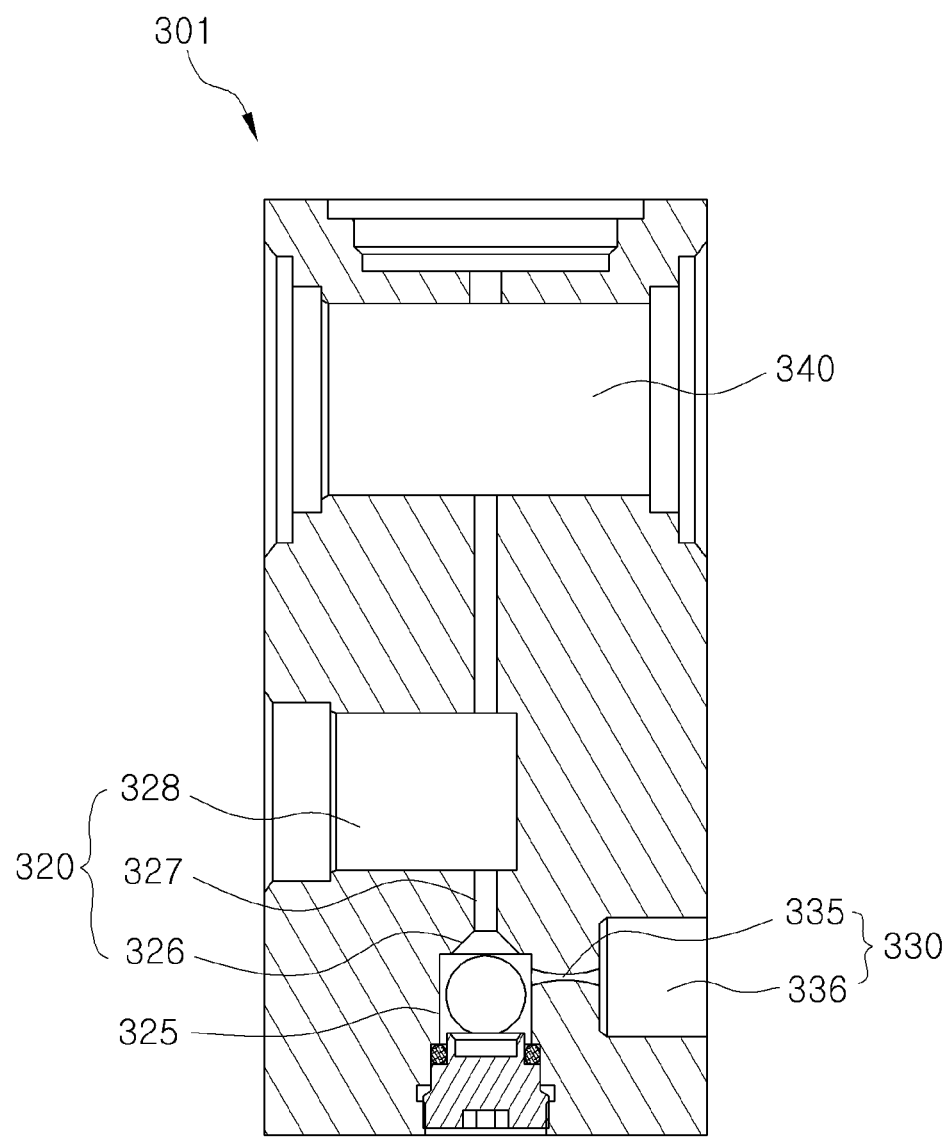
Figure 19:
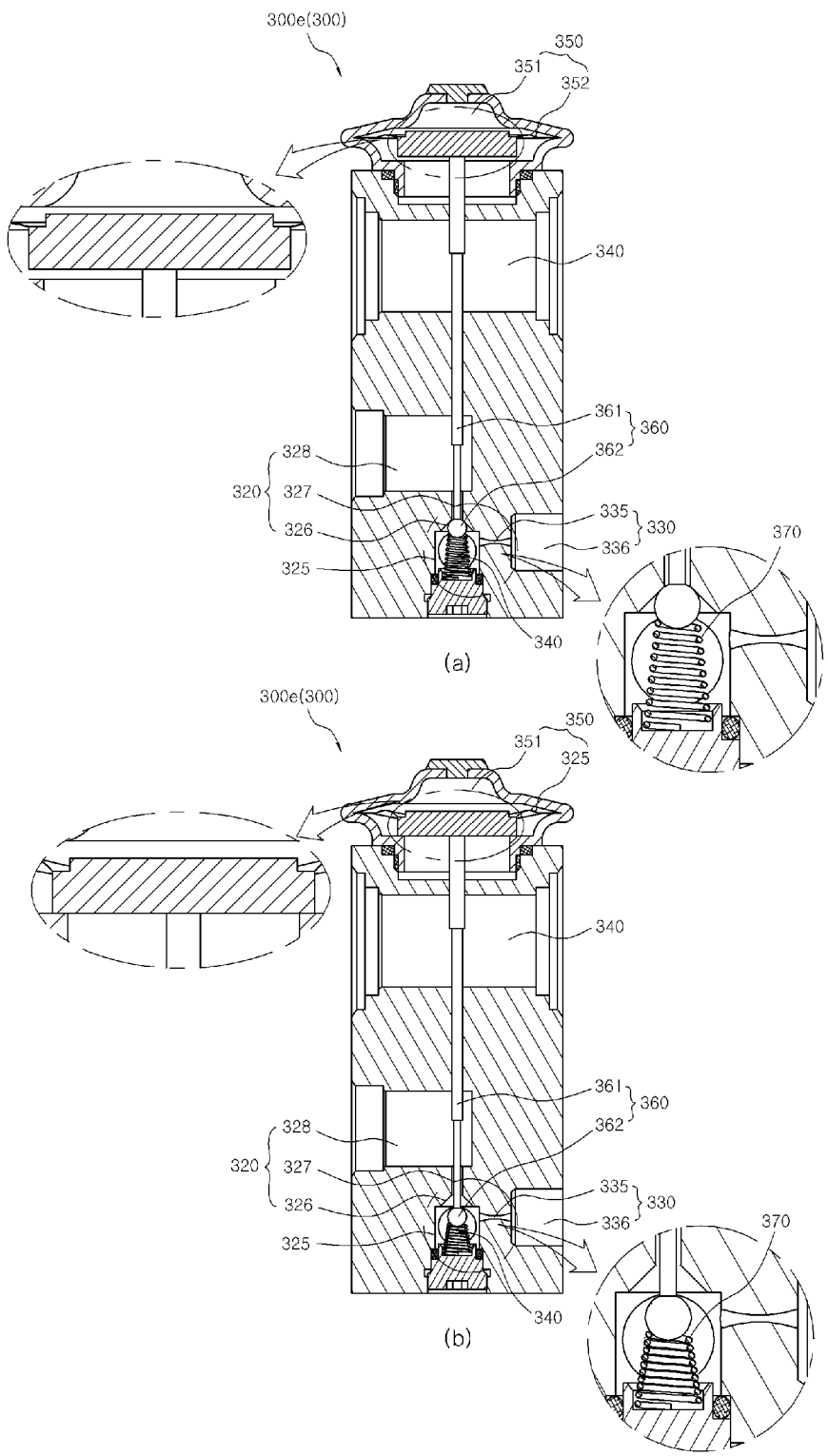
FIG. 19 is a diagram for explaining an internal operation of the expansion valve.

The operation of the expansion valve 300e will be described with reference to FIG. 13.

First, FIG. 13A shows a case where the temperature of refrigerant passing through the discharge passage 340 is low. The expansion valve 300e contracts the power element 350 when the temperature of the refrigerant passing through the discharge passage 340 is low and the pair of control units 360 closes the first communicating hole 323 and the second communicating hole 333 to close the first supply passage 320 and the second supply passage 330, such that the refrigerant is not supplied to the evaporator 400.

To the contrary, FIG. 13B shows a case where the temperature of the refrigerant passing through the discharge passage 340 is high. The expansion valve 300e expands the power element 350 when the temperature of the refrigerant passing through the discharge passage 340 is high and the pair of control units 360 moves in a direction opposite to a direction in which the elastic force of the elastic units 370 is applied to open the first communicating hole 323 and the second communicating hole 333, respectively, such that the refrigerant is supplied to the evaporator 400 through the first supply passage 320 and the second supply passage 330.

Further, the refrigerant cycle 1000 of an air conditioner for vehicles according to this document includes a first guide part 322 and a second guide part 332 each inclined to the first communicating unit 323 and the second communicating hole 333 in order to guide the positions of the balls 362 to the first space part 321 and the second space part 331.

The first guide part 322 and the second guide part 332 are a space in which the balls 362 are seated. The refrigerant cycle 1000 of an air conditioner for vehicles according to this document includes the first guide part 322 and the second guide part 332, thereby making it possible to certainly close the first supply passage 320 and the second supply passage 330 and further smoothing the flow of flowing refrigerant by moving the balls 362 of the control units 360 in a direction opposite to the elastic force of the elastic unit 370.

The amount of refrigerant supplied to the first evaporating unit 410 and the second evaporating unit 420 through the first supply passage 320 and the second supply passage 330 may be controlled by making the size of the first communicating hole 332 and the second communicating hole 333 formed in the main body 301 different from each other, or the size of the balls 362 formed in the first communicating hole 323 and the second communicating hole 333 different from each other, or the like.

In this case, the distances where the pair of rods 361 moves by the power element 350 are the same.

In addition, the refrigerant amount supplied to the first evaporating unit 410 and the second evaporating unit 420 may be controlled by allowing the elastic units 370 supporting the pair of balls 362 to have a different elastic force.

The refrigerant cycle 1000 of an air conditioner for vehicles according to this document uses the expansion valve 300e in which the discharge passage 340 is formed to control the amount of refrigerant supplied to the first evaporating unit 410 and the second evaporating unit 420 of the evaporator 400 through the discharge temperature of the evaporator 400, thereby making it possible to lower the pressure drop amount of refrigerant.

The expansion unit 300 shown in FIGS. 14 to FIG. 19 is configured to include a third space part 325 in which the main body 301 communicates with the inlet 310, a third outlet 328 communicating with the third space part 325 by the third communicating hole 327 to form the first supply passage 320, and a fourth outlet 336 communicating with the third space part 325 by an orifice 335 to form the second supply passage 330.

The configuration of the third space part 325, the third communicating hole 327, and the third outlet 328 is the same as the configuration of the first space part 321, the first communicating hole 323, and the first outlet 324 (a second space part 331, a second communicating hole 333, and a second outlet 334). The opening and closing of the third communicating hole 327 is determined by the control unit 360.

The fourth outlet 336 communicates with the third space part 325 by the orifice 335 to branch and discharge some of the refrigerant.

In the structure shown in FIGS. 14 to 19, the first supply passage 320 is formed through the third space part 325, the third communicating hole 327, and the third outlet 328 and the second supply passage 330 is formed through the orifice 335 and the fourth outlet 336 to branch some of the refrigerant from the third space part 325.

In this case, the length of the rod 361 of the control unit 360 is controlled to dispose the ball 362 in the third space part 325.

In addition, the third space part 325 is provided with the third guide part 326 inclined to the third communicating hole 327 to guide the position of the ball 362 formed in the control unit 360 and has an elastic unit applying an elastic force to the side supplying the ball 362 formed therein.

In addition, the orifice 335 is formed to have a structure where the internal diameter gradually narrows toward the longitudinal direction (flow direction of refrigerant) and then becomes wide, thereby throttling the refrigerant.

The operation of the refrigerant cycle 1000 of an air conditioner for vehicles according to this document will be described below. First, the high-temperature and high-pressure gas refrigerant compressed in the compressor 100 is introduced into the condenser 200.

The gas refrigerant introduced into the condenser 200 is changed into the high-temperature and high-pressure liquid refrigerant while being condensed through the heat-exchange with the outside air and then, decompressed and expanded while passing through the expansion unit 300 and distributed into the pair of the branch passages 501 and 502.

In this case, the expansion unit 300 is controlled so that the refrigerant flow flowing in the branch passages 501 and 502 connected to the first evaporating unit 410 is relatively more than that flowing in the branch passages 501 and 502 connected to the second evaporating unit 420.

The first supply passage 320 of the expansion unit 300 communicates with the first evaporating unit 410 disposed upstream in the air flow direction and the second supply passage 330 communicates with the second evaporating unit 420 disposed downstream in the air flow direction.

The low-temperature and low-pressure refrigerant distributed into each of the first evaporating unit 410 and the second evaporating unit 420 of the evaporator 400 cools air blown to the inside of a car by the endothermic action due to the evaporation latent heat of the refrigerant while being evaporated by heat-exchanging with air blown to the inside of a car through the single blow 700.

Thereafter, the refrigerant discharged from the first evaporating unit 410 and the second evaporating unit 420 of the evaporator 400 passes through the connection passage of the expansion valve 300e of the expansion unit 300 and is then introduced into the compressor 100, thereby re-circulating the cycle as described above.

Figure 20:
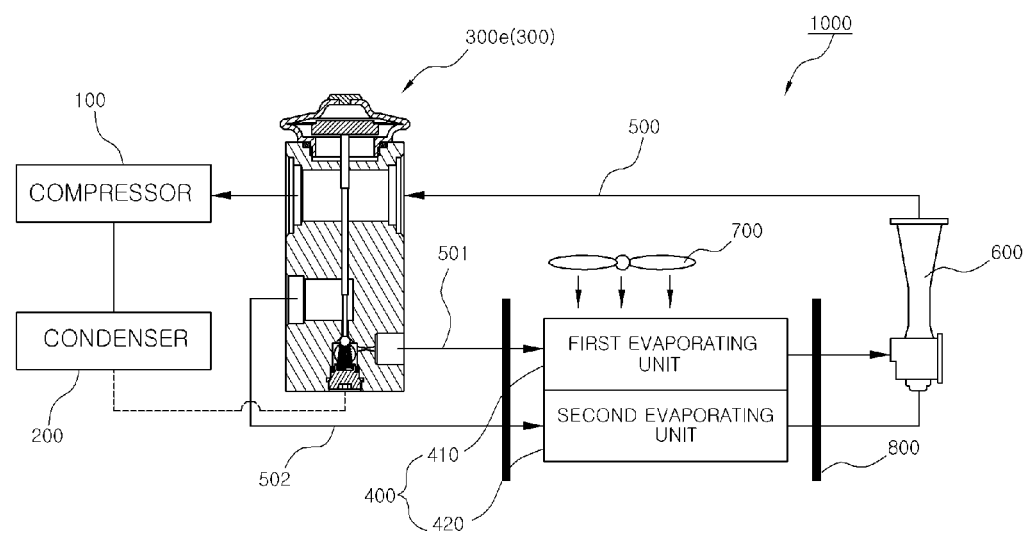
FIG. 20 is another configuration diagram of a refrigerant cycle of an air conditioner for vehicles.

Meanwhile, as shown in FIG. 20, the refrigerant cycle 1000 of an air conditioner for vehicles according to this document may further include an ejector 600 in which the refrigerant passing through the first evaporating unit 410 and the second evaporating unit 420 of the evaporator 400 are mixed.

The ejector 600 is provided between the evaporator 400 and the compressor 100 to suck and boost the refrigerant discharged from one of the first evaporating unit 410 and the second evaporating unit 420 by using the flow velocity of the refrigerant discharged from the other one of the first evaporating unit 410 and the second evaporating unit 420 and supply it to the compressor 100.

FIG. 20 shows an example where the ejector 600 sucks the refrigerant passing through the first evaporating unit 410 by using the flow velocity of refrigerant passing through the second evaporating unit 420 but the refrigerant cycle 1000 of an air conditioner for vehicles according to this document is not limited thereto.

The refrigerant cycle 1000 of an air conditioner for vehicles according to this document includes the ejector 600, such that it can easily mix the refrigerant passing through the first evaporating unit 410 and the second evaporating unit 420 even though the evaporator 400 is configured to include the first evaporating unit 410 and the second evaporating unit 420.

Meanwhile, FIG. 3 shows an example where the refrigerant discharged from the first evaporating unit 410 and the second evaporating unit 420 is directly introduced into the compressor 100, for convenience; however, the refrigerant passes through the connection passage of the first expansion valve 300a and the second expansion valve 300b before being introduced into the compressor 100.

The refrigerant cycle 1000 of an air conditioner for vehicles according to this document has the first evaporating unit 410 and the second evaporating unit 420 disposed upstream and downstream in a direction in which the air blown from the single blower flows to control the amount of the refrigerant supplied to each evaporating unit, thereby making it possible to obtain the optimal radiating performance (cooling performance) and cooling efficiency (COP) through the design of the optimal refrigerant flow ratio depending on the cooling load.

This document is not limited to the embodiment described herein and it should be understood that this document may be modified and changed in various ways without departing from the spirit and the scope of this document. Therefore, it should be appreciated that the modifications and changes are included in the claims of this document.

The invention claimed is:

1. An air conditioner for vehicles, comprising:
a compressor for sucking and compressing a refrigerant;
a condenser for condensing the refrigerant compressed in the compressor;
an expansion unit for expanding the refrigerant after branching the refrigerant discharged from the condenser; and
an evaporator including a first evaporating unit and a second evaporating unit each for receiving and evaporating the expanded refrigerants branched from the expansion unit, wherein the expansion unit comprises:
a first expansion valve; and
a second expansion valve, wherein a discharge from the condenser is branched to a pair of branch passages, with an expansion valve of the first and second expansion valves being provided on each branch passage of the pair of branch passages, and the first expansion valve and the second expansion valve are arranged in a parallel configuration and configured to allow the refrigerant to be distributed into the first evaporating unit and the second evaporating unit, respectively, to control the refrigerant flow ratio, and wherein the first evaporating unit and the second evaporating unit are arranged in a parallel configuration,
wherein the first evaporating unit is disposed upstream and the second evaporating unit is disposed downstream, in a direction in which air blown from a single blower flows, and the first evaporating unit and the second evaporating unit are disposed to be contacted to each other,
wherein the first evaporating unit and the second evaporating unit are configured to simultaneously receive the refrigerant which has passed through the expansion unit, and
wherein the first evaporating unit disposed upstream in the air flowing direction is supplied with a relatively larger amount of refrigerant than the second evaporating unit disposed downstream.

2. The refrigerant cycle of an air conditioner for vehicles of claim 1, wherein a refrigerant flow ratio distributed into the first evaporating unit and the second evaporating unit, respectively, is in a range of 58%:42%~75%:25%.

3. The refrigerant cycle of an air conditioner for vehicles of claim 1, wherein the first evaporating unit and the second evaporating unit are formed so that the single evaporator is separated into two evaporation regions.

* * * * *